United States Patent

[11] 3,578,775

[72] Inventor James W. McMillen
 2011 Belmont Blvd., Nashville, Tenn. 37212
[21] Appl. No. 800,904
[22] Filed Feb. 20, 1969
[45] Patented May 18, 1971

[54] VEHICLE-WASHING APPARATUS
 10 Claims, 3 Drawing Figs.
[52] U.S. Cl............................................. 134/45, 134/172
[51] Int. Cl............................................. B60s 3/04
[50] Field of Search................................ 134/45, 123, 172; 15/(CCP Digest)

[56] References Cited
UNITED STATES PATENTS
3,012,564 12/1961 Dick............................ 134/123X
3,072,130 1/1963 Grabenhorst................. 134/123X
3,299,901 1/1967 Axe et al...................... 134/123

FOREIGN PATENTS
831,956 2/1952 Germany...................... 134/123

Primary Examiner—Robert L. Bleutge
Attorney—Harrington A. Lackey

ABSTRACT: A vehicle-washing apparatus having a longitudinally disposed overhead spray frame supporting longitudinally spaced spray heads for reciprocable movement transversely above a vehicle to be washed, and a pair of vertically disposed side frames supporting vertically spaced side spray heads and mounted for reciprocable movement longitudinally along opposite sides of the vehicle. The overhead frame may include depending end frames having vertically spaced end spray heads for washing the opposite ends of the vehicle, and the overhead spray heads may be arranged at different elevations to define the contour of the vehicle.

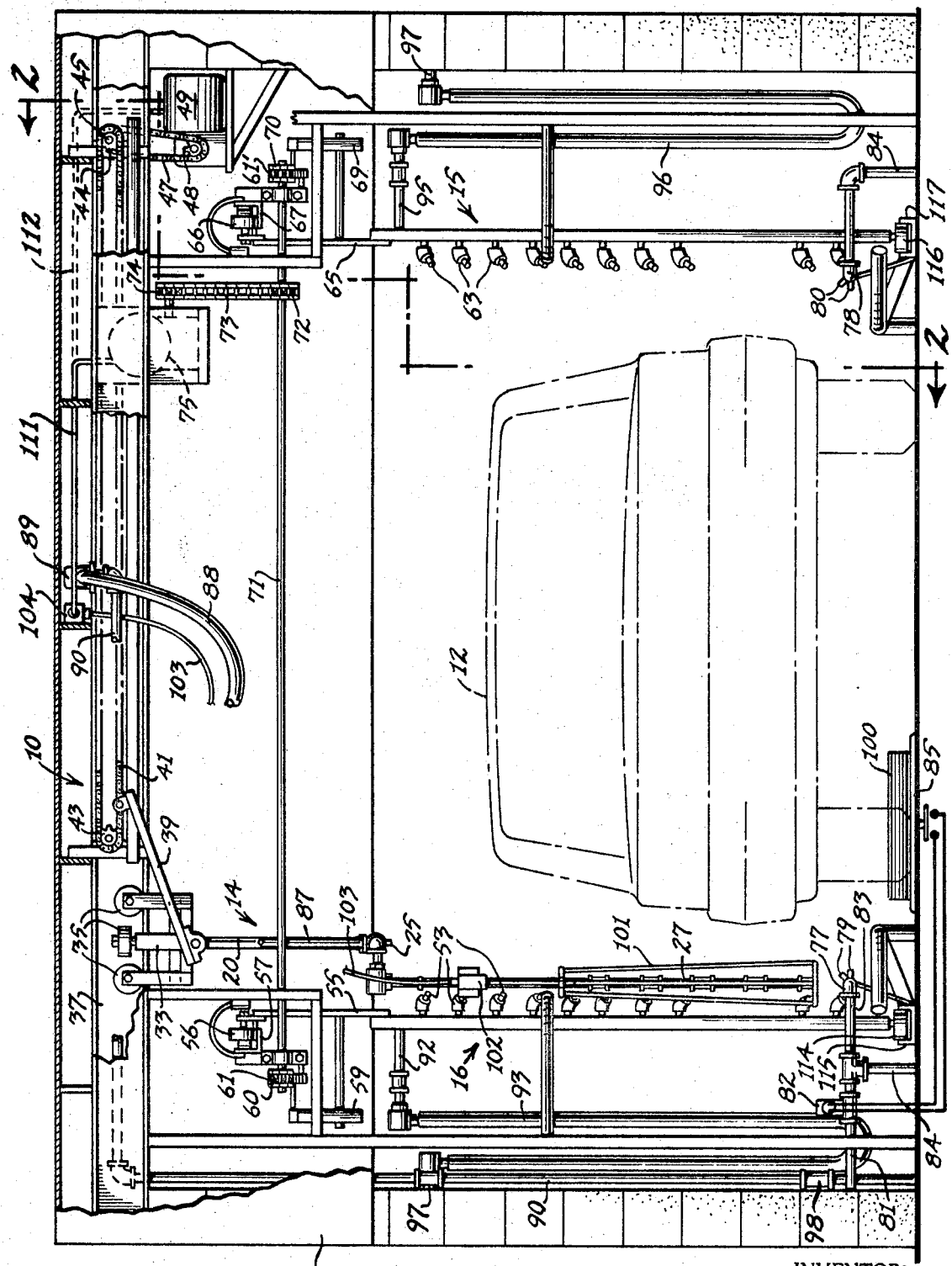

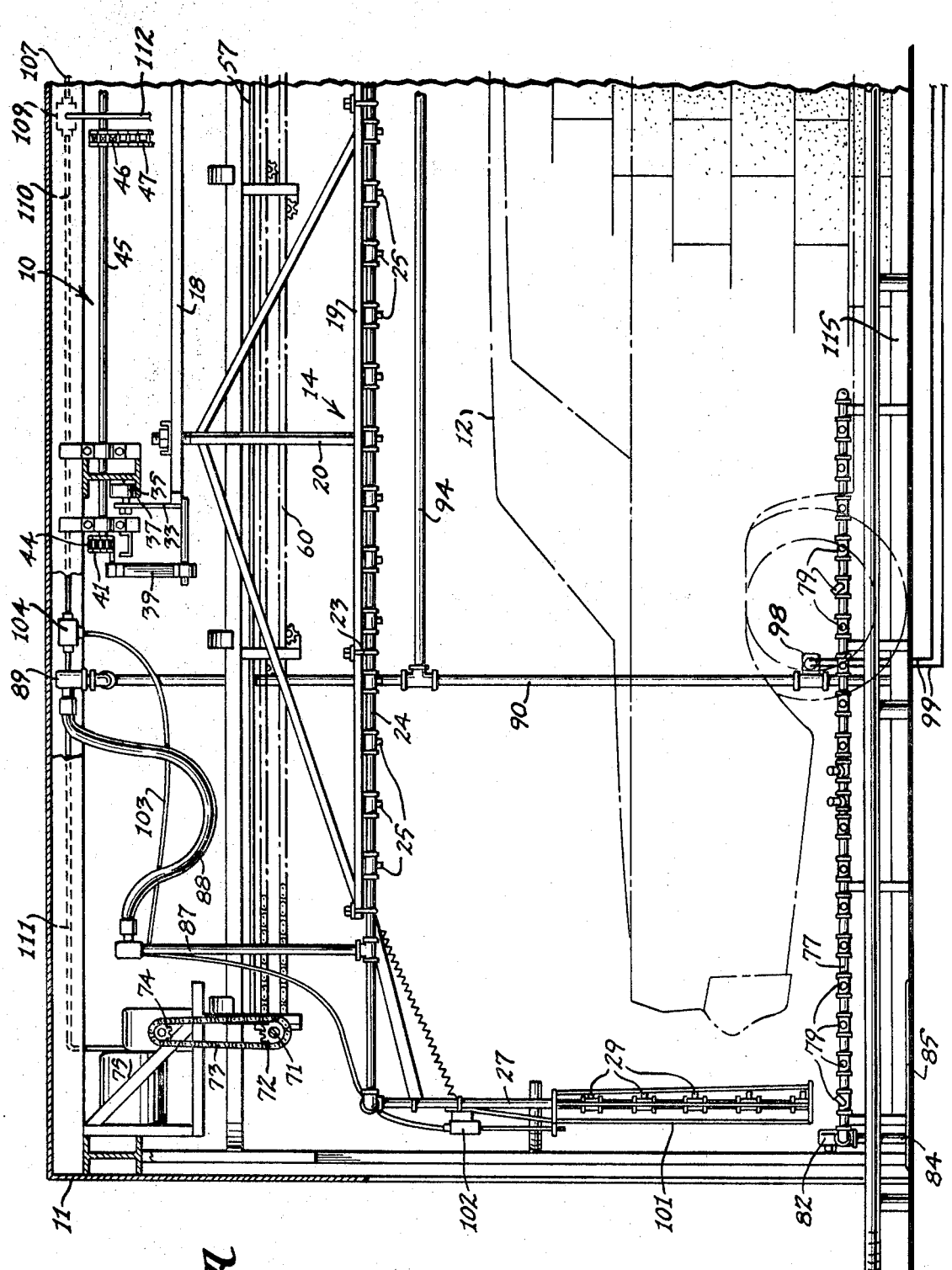

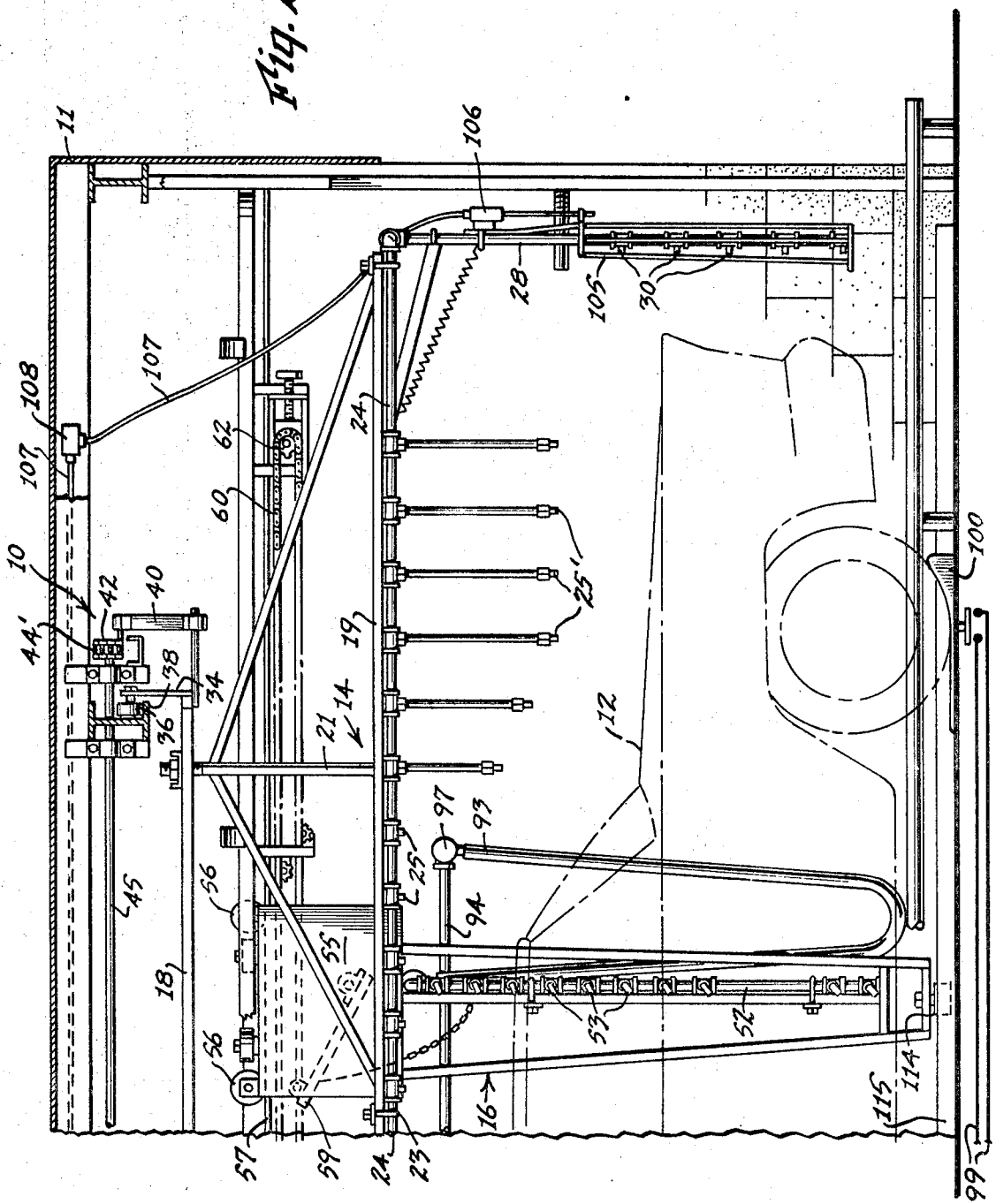

3,578,775

VEHICLE-WASHING APPARATUS

BACKGROUND OF THE INVENTION

This invention relates to a vehicle-washing apparatus, and more particularly to an apparatus having movable spray heads for washing a stationary vehicle.

Conventionally, vehicles are automatically washed by being towed through a series of brushes and sprays located at different stations along the path of the vehicle. There are also vehicle-washing apparatus in which the vehicle may be washed in a stationary position by the operator of the vehicle manipulating a flexible hose and nozzle to spray and cleanse various parts of the vehicle.

SUMMARY OF THE INVENTION

This invention contemplates a vehicle-washing apparatus in which the operator of the vehicle may drive into the washing station, park his car and remain in the car while the vehicle is washed. The principal elements of the washing apparatus are a transversely movable longitudinal overhead spray frame and a pair of longitudinally movable vertically disposed side spray frames disposed on opposite sides of the vehicle. The overhead spray frame is preferably provided with depending end spray frames having vertically spaced spray heads so that the transverse reciprocable movement of the overhead spray frame will cause the spray heads to cleanse the entire top and ends of the vehicle.

The reciprocable longitudinal movement of the side spray frames will cause the side spray heads to cleanse both sides of the vehicle from end to end.

Consequently, the entire surface of the vehicle is cleaned during the simultaneous reciprocable movement of the three spray frames. An effective cleaning operation is conducted by one or several passes or traverse of each spray frame.

BRIEF DESCRIPTION OF THE DRAWINGS

FIG. 1 is a rear elevation of the apparatus, with parts broken away, and with the overhead frame disclosed at the left side of the vehicle shown in phantom;

FIGS. 2A and 2B are rear and forward portions, respectively, of a section taken along the line 2–2 of FIG. 1.

DESCRIPTION OF THE PREFERRED EMBODIMENT

Referring now to the drawings in more detail, the washing apparatus 10 made in accordance with this invention may be confined within a stationary structure, such as a vehicle shelter 11, to define a washing station for a vehicle such as the automobile 12 disclosed in phantom.

The apparatus 10 includes an elongated overhead spray frame 14, a right side spray frame 15 and a left side spray frame 16. The overhead spray frame 14 is mounted within the housing 11 to reciprocably move transversely the full width of and above the vehicle 12. The side spray frames 15 and 16 are mounted within the housing 11 to reciprocably move longitudinally, and preferably simultaneously, the full length of the washing station on opposite sides of the vehicle 12.

As disclosed in FIGS. 2A and 2B, the overhead spray frame 14 includes a top bar 18 and a bottom bar 19 secured together by the vertical rods 20 and 21. Fixed to the bottom bar 19 to extend longitudinally above and the full length of the vehicle 12 by collars or U-bolts 23 is the overhead spray pipe 24 including the longitudinally spaced overhead spray heads 25.

Connected to the opposite ends of and depending from the overhead spray pipe 24 is a vertically disposed rear end spray pipe 27 and vertically disposed front end spray pipe 28. Connected to the spray pipes 27 and 28 are vertically spaced rear spray heads 29 and front spray heads 30, respectively. The end spray pipes 27 and 28 depend low enough that the lowest spray head 29 and 30 will discharge fluid at approximately the lower level of the chassis of the vehicle 12.

The top bar 18 of the overheat frame 14 is connected at its opposite ends by hangers 33 and 34 having a plurality of rollers 35 and 36, respectively, riding on the transverse tracks 37 and 38. The opposite ends of the top bar 18 are also connected by link arms 39 and 40 to the respective endless chains 41 and 42 trained about the respective sprockets 43, 44 and 44'. The shaft 45 carrying the sprockets 44 and 44' is driven through sprocket 46, chain 47, drive sprocket 48 and electrical motor 49. As the endless overhead transverse chains 41 and 42 are continuously driven by the motor 49, the overhead spray frame 14 is reciprocably moved transversely within the shelter 11 to traverse a distance greater than the width of the vehicle 12 parked in the washing station within the shelter 11.

As best disclosed in FIG. 2B, a vertically disposed side spray pipe 52 is mounted within the left side frame 16 and includes a series of vertically spaced, side spray heads 53 extending substantially the full height of the vehicle 12 when parked in the washing station. The upper end of the side frame 16 comprises a platelike hanger 55 suspended by rollers 56 upon a longitudinally disposed overhead track 57. A link arm 59 connects the hanger plate 55 to a longitudinally disposed endless chain 60. The chain 60 is trained about sprockets 61 and 62 fixed to the overhead structure of the shelter 11.

The right side spray frame 15 is constructed identically to the spray frame 16 on the opposite side of the vehicle 12 and includes a plurality of vertically spaced spray heads 63. The right spray frame 15 also includes a hanger 65 (FIG. 1) having rollers 66 mounted on a track 67 extending at the same level and parallel to the track 57. The right frame hanger 55 is also connected by a link arm 69 to an endless chain 70 trained about sprockets, such as 61', in alignment with the respective sprockets 61 and 62 supporting the endless chain 60. The rear sprockets 61 and 61' are fixed upon a transverse shaft 71 supporting a driven sprocket 72 and connected through driven chain 73 and drive sprocket 74 to the motor 75 fixed in the upper portion of the shelter 11. Thus, the motor 75 drives both endless chains 60 and 70 to simultaneously and reciprocably move the side spray frames 16 and 15 longitudinally on both sides of the vehicle 12.

Mounted on opposite sides of the rear portion of the vehicle 12 parked in the washing station are a pair of longitudinally disposed wheel spray pipes 77 and 78, carrying longitudinally spaced spray heads 79 and 80. These spray pipes 77 and 78 are mounted at approximately the level of the wheels of the vehicle 12. The wheel spray pipes 77 and 78 are supplied with fluid through wheel inlet pipe 81 controlled by solenoid valve 82 and branch pipes 83 and 84. The inlet pipe is supplied with appropriate cleaning or rinsing fluids by a pump, not shown. It will be noted in FIG. 1 that the branch pipe 84 depends into the floor of the shelter 11 on the left side of the washing station, passes beneath the floor and rises on the right side of the station.

A treadle switch 85 is mounted just inside the entrance to the shelter 11. As the left front wheel of the vehicle 12 depresses the switch 85, the solenoid valve 82 is energized to admit fluid to the wheel spray pipes 77 and 78 simultaneously. The treadle switch 85 is of the type that remains closed for a predetermined period of time after the weight of the vehicle is removed. Thus, when the left front wheel depresses the treadle switch 85, the front and rear wheels will be thoroughly sprayed before the switch 85 is automatically deenergized to stop the flow of fluid.

Fluid is supplied to the overhead spray pipe 24 through an overhead inlet pipe 87, a flexible hose 88, fluid coupling 89 and riser 90. The riser 90 descends into the floor of the shelter 11 where it is supplied with the appropriate cleaning or rinsing fluid by a pump, not shown.

Cleaning or rinsing fluid is supplied to the left-side spray pipe 52 through left inlet pipe 92, flexible hose 93 and branch pipe 94 connected to riser 90. In a similar manner, cleaning or rinsing fluid is supplied to the right side spray heads 63 through the side spray pipe, not shown, inlet pipe 95, flexible hose 96 and connecting pipe 97. The connecting pipe 97 is connected to the flexible hose 96 and extends through the right wall of shelter 11, beneath the shelter floor, and up through the left wall of shelter 11 to communicate with the flexible hose 93.

Thus, the overhead spray heads 25, the end spray heads 29 and 30, the left side spray heads 53 and the right side spray heads 63, are all supplied with fluid from the same pump through riser 90. The flow of fluid through riser 90 is controlled by solenoid valve 98 connected through circuit 90 to front treadle switch 100. As long as the treadle switch 100 is depressed by the left front wheel of the vehicle 12, the solenoid valve 98 is open to discharge fluid through all the movable overhead and side spray heads 25, 29, 30, 53 and 63.

The flexible hose 88 is long enough to permit the overhead frame 14 to fully traverse the width of the vehicle 12. The flexible hoses 93 and 96 are also long enough to extend from their respective connections to the connecting pipe 97 to the extreme limits of traverse of the side spray frames 16 and 15.

Mounted on the rear end spray pipe 27 and surrounding the rear end spray heads 29 is a bumper frame 101 to protect the spray heads 29 against inadvertent rear movement of the vehicle 12 while the overhead frame 14 is traversing the width of the vehicle 12. Moreover, the rear bumper frame 101 is operatively connected to a switch 102, which, when energized by movement of the bumper frame 101 contacted by the rear end of the vehicle 12, will deenergize motor 49 through circuit 103, junction box 104, circuit 110, junction box 109, and circuit 112. Motor 75 will also be deenergized from junction box 104 through circuit 111. Thus, the movement of all three frames 14, 15 and 16 will automatically stop.

In a similar manner, an identical bumper frame 105 is mounted on the front end spray pipe 28 to surround and protect the front end spray heads 30. The front bumper frame 105 is adapted to energize the switch 106, which in turn is connected through the circuit 107 and junction box 108 to junction box 109. The front bumper frame 105 will function in the same manner, both mechanically and electrically, as the rear bumper frame 101, to deenergize both motors 49 and 75.

The end spray pipes 27 and 28 are swively joined to the extremities of the overhead spray pipe 24 to swing in a longitudinal vertical plane. Thus, even though the overhead frame 14 stops in an intermediate position in which the end spray pipes 27 and 28 block the passage of the automobile 12, nevertheless, movement of the automobile 12 in either longitudinal direction will engage and swing the corresponding end spray pipe 27 or 28 to an elevated position, permitting the automobile to pass beneath the end spray pipe.

It will also be observed that all of the spray heads 25, 29, 30, 53, 63, 79 and 80 are directed to discharge fluid toward the vehicle 12 in its washing station disclosed in the drawings.

Another feature of the apparatus 10 is the arrangement of some of the spray heads 25' (FIG. 2B) at different elevations so that the spray heads 25 and 25' are substantially equally spaced in a vertical plane from the longitudinal contour of the vehicle. In this manner, the force and the quantity of the fluid discharged from each spray head 25 and 25' will be substantially uniform. Although depending spray heads comparable to a forward spray head 25' are not shown in the rear of the vehicle 12, nevertheless, such spray heads can very well be incorporated to perform the same function on the rear portion of the vehicle 12 as the spray heads 25' perform on the front portion of the vehicle 12.

The side spray frames 16 and 15 are preferably stabilized in their longitudinal travel by rollers 114 and 116 connected to the bottoms of the respective frames 16 and 15 and guided in longitudinal tracks 115 and 117, respectively.

The operation of the invention is readily apparent from the above description and drawings. When the shelter 11 is empty, and the apparatus 10 is in its inoperative position, the overhead frame 14 must be at one side or the other of the washing station, such as the left side position disclosed in FIG. 1. The initial positions of the side spray frames 15 and 16 are relatively unimportant, since their longitudinal traverse on opposite sides of the vehicle may start and stop at any position.

With the apparatus 10 in its initial position, the vehicle 12 is driven into the shelter 11. When the left front wheel of vehicle 12 actuates the treadle switch 85, the wheel spray heads 79 and 80 discharge cleaning fluid against the outboard sides of the front wheels and then the rear wheels for predetermined periods of time, after which they may stop automatically. After the vehicle 12 is parked in its washing position with its left front wheel depressing the treadle switch 100, the solenoid switch 98 is energized to discharge fluid from all the movable spray heads 25, 29, 30, 53 and 63. About the same time, the motors 49 and 75 may be energized manually or automatically to start the reciprocable movement of the frames 14, 15 and 16.

As the overhead frame 14 traverses the width of the washing station, the entire top of the vehicle as well as the front and rear ends of the chassis are cleaned by the force and detergent action of the fluid sprays from the corresponding spray heads. In a similar manner, both sides of the vehicle are completely sprayed from end to end by the spray heads on the side spray frames 16 and 15. The number of traverses of the respective frames 14, 15 and 16 may depend upon the degree of cleanliness, the force of the water or cleaning fluid, and the amount of detergent and water softener employed.

In a typical operation, the overhead frame 14 will traverse the vehicle 12 about four times during a washing cycle, in which the spray heads discharge a cleansing solution of water, detergent and a water softener. The washing cycle is followed by a rinsing cycle, in which the spray heads discharge water only during three traverses of the frame 14. However, a liquid spray wax may be introduced into the water during the last two traverses of the overhead frame 14. The same washing and rinsing cycles are carried out by the side spray frames 15 and 16 substantially simultaneously as by the overhead frame 14.

I claim:
1. A vehicle-washing apparatus comprising:
   a. a stationary structure defining a washing station having longitudinal and transverse dimensions for receiving a vehicle,
   b. an elongated overhead frame extending longitudinally of said station,
   c. means supporting said overhead frame on said structure for reciprocable movement transversely of said station and above a vehicle in said station,
   d. a series of longitudinally spaced overhead spray heads mounted on said overhead frame spanning substantially the length of a vehicle in said station,
   e. at least one side frame extending vertically along a side of said station,
   f. means supporting said side frame on said structure for longitudinal reciprocable movement along a side of a vehicle in said station,
   g. a series of vertically spaced side spray heads mounted on said side frame spanning substantially the height of a vehicle in said station, and
   h. means for supplying a fluid to said spray heads.

2. The invention according to claim 1 in which said at least one side frame comprises two side frames, disposed on opposite sides of a vehicle in said station, said side spray heads being mounted on each of said side frames, said side frame-supporting means supporting both of said side frames for reciprocable longitudinal movement on opposite sides of a vehicle in said washing station.

3. The invention according to claim 1 further comprising drive means mounted on said structure for reciprocably moving said overhead frame transversely substantially the width of the vehicle in said station and for reciprocably moving each side frame longitudinally substantially the length of said vehicle.

4. The invention according to claim 3 in which said drive means comprises a transversely disposed overhead endless chain mounted on said structure, overhead motive means for driving said overhead chain, and overhead link means connecting said overhead chain to said overhead frame for reciprocable movement, a longitudinally disposed endless side chain for each of said side frames, side motive means for driving said endless side chain, side link means for connecting side chain to said side frame for reciprocable movement.

5. The invention according to claim 1 in which at least some of said overhead spray heads are arranged at different elevations to substantially define the longitudinal contour of said vehicle so that said some overhead spray heads are substantially uniformly spaced from the surface of said vehicle.

6. The invention according to claim 1 in which said fluid supply means comprises a stationary fluid supply outlet, and an overhead flexible hose connecting said supply outlet to said overhead spray heads, and a side flexible hose connecting said supply outlet to said side spray heads, so that said spray heads are continuously supplied with fluid during their reciprocable movement with said corresponding frames.

7. The invention according to claim 1 in which said overhead frame comprises depending end frames at opposite ends thereof, spaced apart a distance greater than the length of a vehicle in said station, vertically spaced end spray heads mounted on each end frame spanning substantially the height of said vehicle.

8. The invention according to claim 7 further comprising an elongated fluid conduit mounted on said overhead frame and said end frames and carrying said overhead spray heads and said end spray heads, and connected to said fluid supply means.

9. The invention according to claim 7 further comprising bumper means on said end frames, drive means for moving said overhead frame and said side frame, and means operatively connecting said bumper means and said drive means to stop the movement of said frames when a vehicle engages said bumper means.

10. The invention according to claim 1 further comprising a pair of wheel spray means mounted in said station on opposite sides of a vehicle in said station, and means for supplying fluid through said wheel spray means to wash the wheels of said vehicle.